United States Patent
Holm et al.

(10) Patent No.: US 9,555,346 B2
(45) Date of Patent: Jan. 31, 2017

(54) FILTER WITH TRI-FLOW PATH COMBINATIONS

(75) Inventors: Christopher E. Holm, Madison, WI (US); Michael J. Connor, Stoughton, WI (US); Peter K. Herman, Stoughton, WI (US); Scott W. Schwartz, Cottage Grove, WI (US)

(73) Assignee: CUMMINS FILTRATION IP INC., Columbus, IN (US)

( * ) Notice: Subject to any disclaimer, the term of this patent is extended or adjusted under 35 U.S.C. 154(b) by 1132 days.

(21) Appl. No.: 13/397,109

(22) Filed: Feb. 15, 2012

(65) Prior Publication Data

US 2012/0285901 A1    Nov. 15, 2012

Related U.S. Application Data

(60) Provisional application No. 61/484,533, filed on May 10, 2011.

(51) Int. Cl.
| | | |
|---|---|---|
| *B01D 29/07* | (2006.01) | |
| *B01D 46/00* | (2006.01) | |
| *B01D 46/52* | (2006.01) | |
| *B01D 46/24* | (2006.01) | |
| *B01D 35/02* | (2006.01) | |
| *B01D 29/54* | (2006.01) | |
| *B01D 29/21* | (2006.01) | |

(52) U.S. Cl.
CPC .......... *B01D 29/073* (2013.01); *B01D 29/216* (2013.01); *B01D 29/54* (2013.01); *B01D 35/02* (2013.01); *B01D 46/0012* (2013.01); *B01D 46/0021* (2013.01); *B01D 46/2411* (2013.01); *B01D 46/528* (2013.01); *B01D 2275/206* (2013.01); *B01D 2275/207* (2013.01); *B01D 2275/208* (2013.01)

(58) Field of Classification Search
None
See application file for complete search history.

(56) References Cited

U.S. PATENT DOCUMENTS 3,180,712 A * 4/1965 Hamblin ............. B01D 53/944
                                                     181/276
3,297,400 A * 1/1967 Eastwood ........... B01D 53/944
                                                     422/107

(Continued)

FOREIGN PATENT DOCUMENTS

| CN | 88101118 | 8/1988 |
|---|---|---|
| CN | 1541745 | 11/2004 |

(Continued)

OTHER PUBLICATIONS

International Preliminary Report on Patentability for International Application No. PCT/US2012/027938, dated Nov. 12, 2013, 7 pages.

(Continued)

*Primary Examiner* — Robert James Popovics
(74) *Attorney, Agent, or Firm* — Foley & Lardner LLP (57) ABSTRACT

A filter includes a plurality of annular filter elements arranged in axially staggered relation. An axial flow path includes a plurality of flow path segments, some being filtered by a respective filter element, and others bypassing a respective filter element. Various combinations are provided.

10 Claims, 9 Drawing Sheets

(56) References Cited

U.S. PATENT DOCUMENTS

| | | | |
|---|---|---|---|
| 3,544,264 A * | 12/1970 | Hardison | B01D 53/9413 422/181 |
| 3,824,788 A * | 7/1974 | Cole et al. | 60/274 |
| 3,879,944 A * | 4/1975 | Bertsch | 60/299 |
| 4,404,798 A * | 9/1983 | Takagi | F01N 3/0211 55/282 |
| 4,419,113 A | 12/1983 | Smith | |
| 4,427,423 A | 1/1984 | Montierth | |
| 4,625,511 A * | 12/1986 | Scheitlin | F01N 3/0211 422/168 |
| 4,673,423 A | 6/1987 | Yumlu | |
| 4,686,827 A * | 8/1987 | Wade | F01N 3/027 422/169 |
| RE33,118 E | 11/1989 | Scheitlin et al. | |
| 4,924,570 A | 5/1990 | Mizrah et al. | |
| 4,961,314 A * | 10/1990 | Howe | F01N 1/02 181/231 |
| 5,052,178 A | 10/1991 | Clerc et al. | |
| 5,089,236 A * | 2/1992 | Clerc | F01N 3/2053 422/168 |
| 5,144,796 A * | 9/1992 | Swars | F01N 3/2053 422/180 |
| 5,212,948 A * | 5/1993 | Gillingham | F01N 1/02 55/314 |
| 5,218,817 A * | 6/1993 | Urata | F01N 1/089 422/172 |
| 5,238,472 A * | 8/1993 | Pfister | F01N 3/0212 55/282 |
| 5,293,742 A * | 3/1994 | Gillingham | F01N 3/0212 55/466 |
| 5,315,824 A * | 5/1994 | Takeshima | F01N 3/0835 422/169 |
| 5,320,657 A | 6/1994 | Adams | |
| 5,368,621 A | 11/1994 | Pool | |
| 5,458,664 A * | 10/1995 | Ishii | B01D 39/2051 55/282 |
| 5,484,575 A * | 1/1996 | Steenackers | B01D 53/9454 422/169 |
| 5,827,485 A * | 10/1998 | Libal | B01J 8/0214 422/179 |
| 6,013,118 A * | 1/2000 | Matsunuma | B01D 46/002 55/282.3 |
| 6,293,096 B1 * | 9/2001 | Khair | B01D 53/9431 60/286 |
| 6,321,530 B1 * | 11/2001 | Hoshi | B01D 53/9481 180/65.25 |
| 6,327,852 B1 * | 12/2001 | Hirose | B60K 6/445 180/65.235 |
| 6,464,744 B2 | 10/2002 | Cutler et al. | |
| 6,482,247 B2 | 11/2002 | Jaroszczyk et al. | |
| 6,511,599 B2 | 1/2003 | Jaroszczyk et al. | |
| 6,694,727 B1 * | 2/2004 | Crawley | F01N 3/025 251/63 |
| 6,767,378 B2 | 7/2004 | Nishiyama et al. | |
| 6,776,814 B2 | 8/2004 | Badeau et al. | |
| 6,860,917 B2 | 3/2005 | Henrichsen et al. | |
| 6,887,343 B2 | 5/2005 | Schukar et al. | |
| 6,889,498 B1 * | 5/2005 | Chandler | B01D 46/0061 60/274 |
| 6,946,012 B1 | 9/2005 | Miller et al. | |
| 6,968,922 B2 * | 11/2005 | Kawamata | F01N 1/083 181/231 |
| 6,974,537 B2 * | 12/2005 | Abdelqader | B01D 29/018 210/104 |
| 7,052,532 B1 * | 5/2006 | Liu | B01D 39/2075 55/520 |
| 7,111,453 B2 * | 9/2006 | Chandler | B01D 46/0061 60/274 |
| 7,211,226 B2 | 5/2007 | Liu et al. | |
| 7,258,719 B2 | 8/2007 | Miller et al. | |
| 7,273,592 B2 * | 9/2007 | Jacob | F01N 1/24 181/212 |
| 7,314,501 B2 * | 1/2008 | Fayard | F01N 3/0214 55/282.2 |
| 7,323,105 B1 | 1/2008 | Janikowski et al. | |
| 7,341,699 B2 * | 3/2008 | Thieman | B01D 53/9431 422/177 |
| 7,430,857 B2 * | 10/2008 | Chandler | B01D 46/0061 60/274 |
| 7,444,803 B2 * | 11/2008 | Iwamoto | F01N 3/0814 60/274 |
| 7,540,895 B2 | 6/2009 | Furseth et al. | |
| 7,713,324 B2 | 5/2010 | Linhart et al. | |
| 7,799,108 B2 | 9/2010 | Connor et al. | |
| 7,900,443 B2 * | 3/2011 | Stieglbauer | F01N 3/021 60/274 |
| 7,981,176 B2 * | 7/2011 | Rinaldi | B01D 46/0001 55/322 |
| 8,262,759 B2 * | 9/2012 | Amesoeder | 55/309 |
| 8,327,629 B2 * | 12/2012 | Masuda | B01D 46/24 60/296 |
| 8,336,301 B2 * | 12/2012 | Werni | F01N 3/0335 181/222 |
| 8,365,517 B2 * | 2/2013 | Gonze | F01N 3/0256 60/274 |
| 8,443,593 B2 * | 5/2013 | Sloss | F01N 3/2889 137/625.41 |
| 8,621,851 B2 * | 1/2014 | Stieglbauer | F01N 3/021 422/176 |
| 8,852,310 B2 * | 10/2014 | Holzmann | B01D 46/0001 55/484 |
| 9,140,155 B2 * | 9/2015 | Trumper | F01N 3/0217 |
| 9,388,718 B2 * | 7/2016 | Ashraph | F01N 13/08 |
| 2002/0152732 A1 | 10/2002 | Kallsen et al. | |
| 2006/0260285 A1 | 11/2006 | Pfeiffer et al. | |
| 2008/0245060 A1 * | 10/2008 | Stieglbauer | F01N 3/021 60/311 |
| 2010/0275558 A1 * | 11/2010 | Amesoeder | 55/309 |
| 2011/0113755 A1 * | 5/2011 | Kim | B01D 46/0005 60/275 |
| 2011/0138782 A1 * | 6/2011 | Stieglbauer | F01N 3/021 60/274 |
| 2012/0285324 A1 * | 11/2012 | Holm | B01D 29/073 95/286 |
| 2012/0285901 A1 * | 11/2012 | Holm et al. | 210/790 |
| 2012/0285902 A1 | 11/2012 | Holm et al. | |
| 2014/0353064 A1 * | 12/2014 | Trumper | F01N 3/0217 180/309 |

FOREIGN PATENT DOCUMENTS

| | | |
|---|---|---|
| CN | 1753715 | 3/2006 |
| CN | 1761509 | 4/2006 |
| DE | 1957956 | 1/1967 |
| DE | 44 14 960 | 11/1994 |
| DE | 29923422 | 11/2000 |
| EP | 1132582 | 9/2001 |
| FR | 891272 | 3/1944 |
| GB | 2076690 | 12/1981 |
| GB | 2135899 | 9/1984 |
| WO | WO-2009/092489 | 7/2009 |

OTHER PUBLICATIONS

The Second Office Action issued in Chinese Patent Application No. 2012800037433, dated Jul. 15, 2015.

* cited by examiner

FILTER WITH TRI-FLOW PATH COMBINATIONS

CROSS-REFERENCE TO RELATED APPLICATION

This application claims the benefit of and priority from Provisional U.S. Patent Application No. 61/484,533, filed May 10, 2011, incorporated herein by reference.

BACKGROUND AND SUMMARY

The invention relates to filters for filtering fluid, including air, liquid, and other fluids.

Filter arrangements with high packaging effectiveness and flexibility in layout remain a continuing need and challenge, including maintaining performance while maximizing space utilization.

The present invention arose during continuing development efforts in the above technology.

DETAILED DESCRIPTION

Reference is made to commonly owned co-pending U.S. patent application Ser. Nos. 13/397,019, and 13/397,113, filed on even date herewith, and having a common specification herewith.

Figure 1:
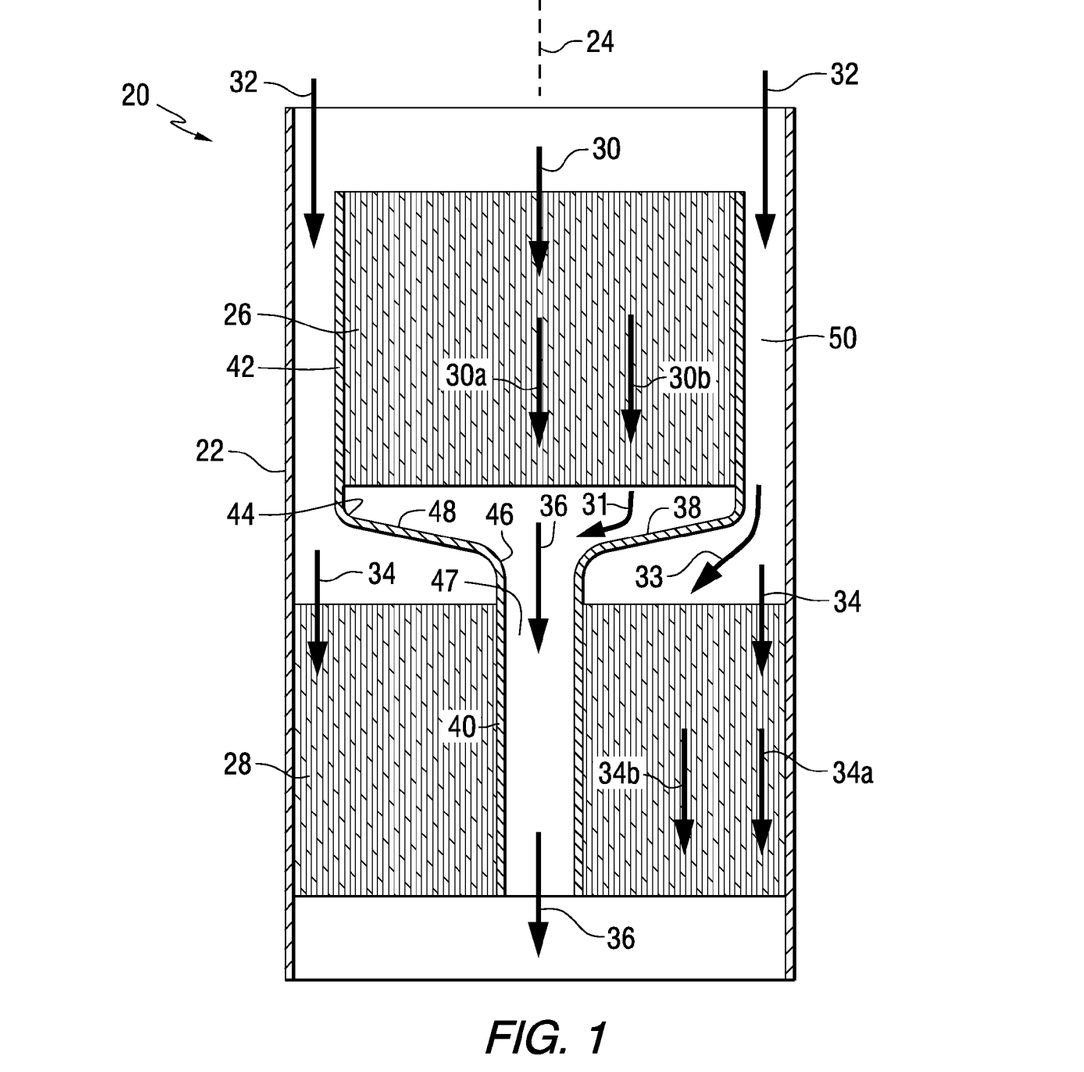
FIG. 1 is a schematic sectional view of a filter in accordance with the present disclosure.
Figure 2:
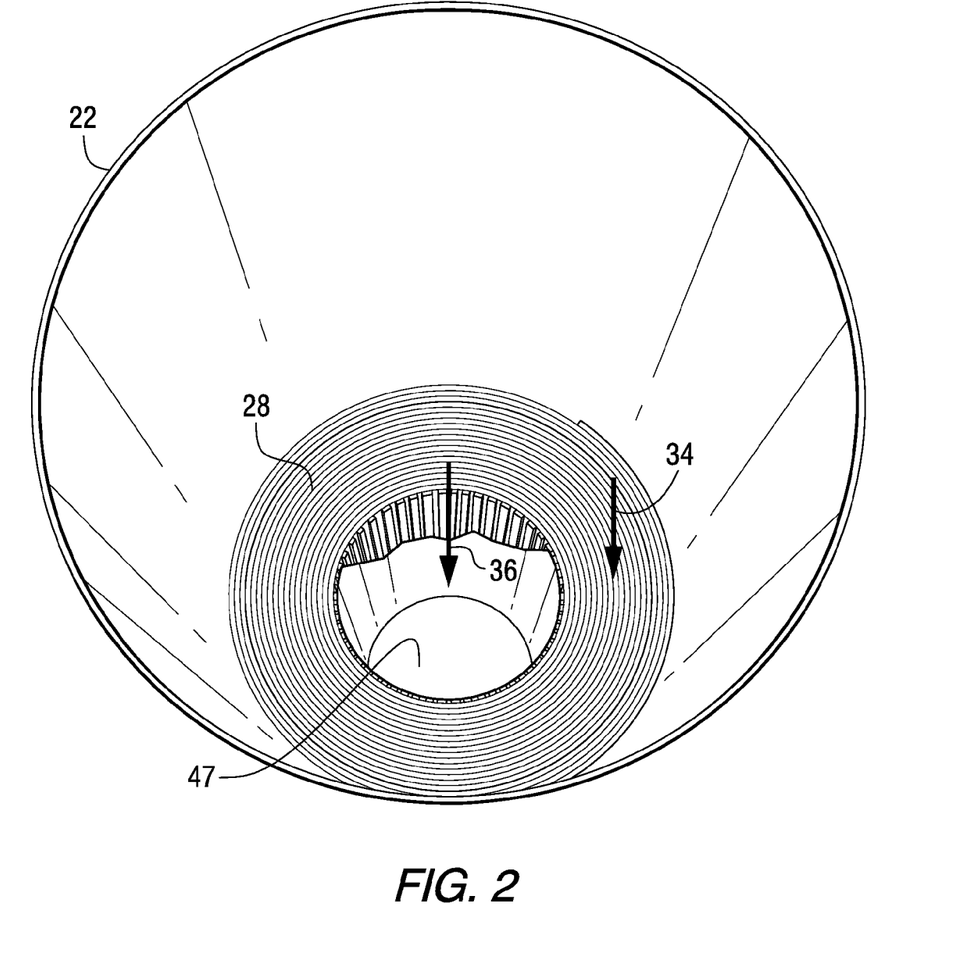
FIG. 2 is a perspective view of a portion of the filter of FIG. 1.
Figure 3:
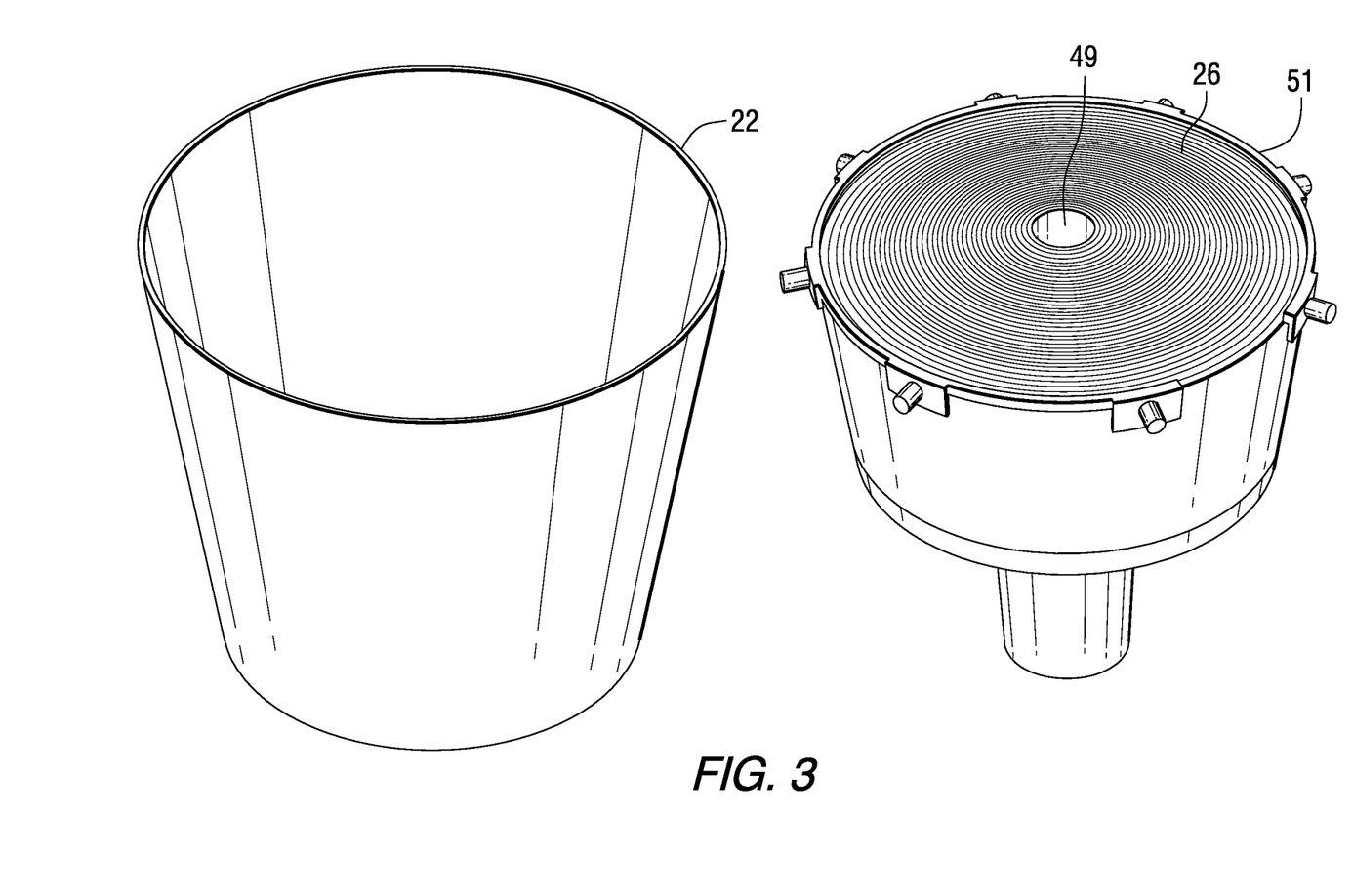
FIG. 3 is a separated perspective view of the components of FIG. 1.
Figure 4:
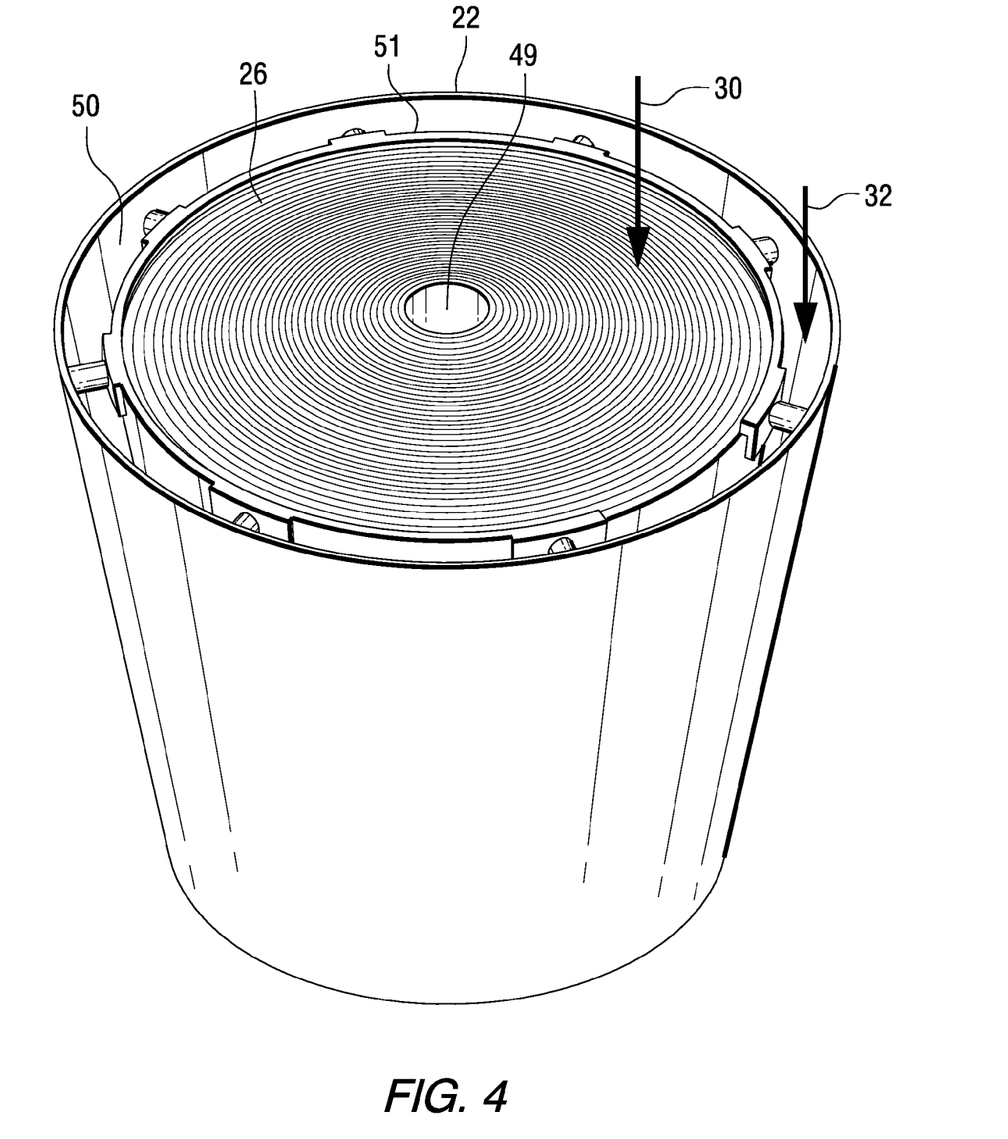
FIG. 4 is an assembled view of the components of FIG. 3.

FIGS. 1-4 show a filter 20 for a housing 22 extending axially along an axial direction 24 and directing fluid along an axial flow path therethrough from upstream to downstream, e.g. downwardly in FIG. 1. The filter includes a plurality of annular filter elements such as 26, 28 for positioning in the housing. The annular filter elements may have an open center, as shown for annular filter element 28, or may have a closed center, with filter media extending all the way thereacross, as shown at annular filter element 26. The axis of the annulus of each annular filter element extends axially along axial direction 24. The annular filter elements are arranged in axially staggered relation in housing 22. The plurality of annular filter elements include at least a first annular filter element 26, and a second annular filter element 28 axially downstream of first annular filter element 26. Each of the filter elements filters fluid by passing the fluid axially therethrough, namely by passing the fluid through alternately sealed upstream ends of axially extending flow channels, then laterally through a filter media wall segment, then axially through alternately sealed downstream ends of the axial flow channels, as is known, for example as shown in the following U.S. patents, incorporated herein by reference: U.S. Pat. Nos. 6,482,247; 6,511,599; 6,776,814; 6,860,917; 6,887,343; 6,946,012; 7,211,226; 7,258,719; 7,323,105. The filter element may be provided by coiled, corrugated, fluted, radially pleated, or circumferentially pleated filter media, with or without embossment.

The fluid flow path has a plurality of flow path segments, including: a first flow path segment 30 flowing axially through first annular filter element 26 and filtered thereby; a second flow path segment 32 flowing axially along a path laterally adjacent first annular filter element 26 and unfiltered thereby, with the second flow path segment 32 being parallel to and laterally adjacent first flow path segment 30; a third flow path segment 34 flowing axially through second annular filter element 28 and filtered thereby; and a fourth flow path segment 26 flowing axially along a path laterally adjacent second annular filter element 28 and unfiltered thereby, with the fourth flow path segment 36 being parallel to and laterally adjacent third flow path segment 34. Third and fourth flow path segments 34 and 36 are axially downstream of first and second flow path segments 30 and 32. First flow path segment 30 flows serially into fourth flow path segment 36. Second flow path segment 32 flows serially into third flow path segment 34. Inner duct 38 separates and isolates flow path segments 30 and 36 from flow path segments 32 and 34. First flow path segment 30 has a first subsegment 30a and a second subsegment 30b. Third flow path segment 34 has a third subsegment 34a and a fourth subsegment 34b. Fluid flows rectilinearly between first subsegment 30a and fourth flow path segment 36. Fluid flows rectilinearly between second flow path segment 32 and third subsegment 34a. Fluid flows curvilinearly as shown as arrow 31 between second subsegment 30b and fourth flow path segment 36. Fluids flows curvilinearly as shown at arrow 33 between second flow path segment 32 and fourth subsegment 34b.

In the embodiment of FIG. 1, fluid flows rectilinearly from second flow path segment 32 to third subsegment 34a, and fluid flows rectilinearly from first subsegment 30a to fourth flow path segment 36. First subsegment 30a and second flow path segment 32 are parallel to each other. Third subsegment 34a and fourth flow path segment 36 are parallel to each other. Second subsegment 30b concentrically surrounds first subsegment 30a. Third subsegment 34a concentrically surrounds fourth subsegment 34b.

Figure 5:
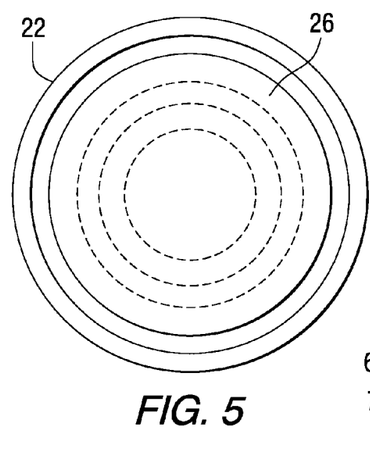
FIG. 5 is a top view of one embodiment of the filter of FIG. 1.
Figure 6:
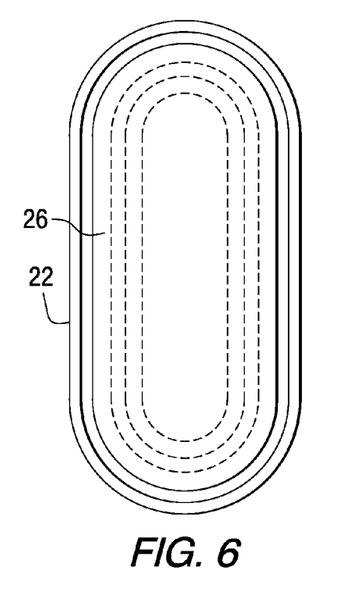
FIG. 6 is like FIG. 5 and shows another embodiment.

Inner duct 38 provides a transition flow duct guiding flow from a first stage at first annular filter element 26 to a second stage at second annular filter element 28. The transition flow duct 38 has an axial extension portion 40 mounting and supporting one of the first and second annular filter elements, e.g. annular filter element 28, in the housing. Axial extension portion 40 of transition flow duct 38 extends axially into the noted one annular filter element, e.g. 28, and is circumscribed thereby and provides mounting support therefor. Transition flow duct 38 has another axial extension portion 42 extending in the opposite direction and circumscribing and mounting and supporting the other of the annular filter elements, e.g. annular filter element 26. In one embodiment, axial extension portion 40 of transition flow duct 38 is a support core around which annular filter element 28 is coiled, and axial extension portion 42 of transition flow duct 38 is a support shell within which annular filter element 26 is coiled. Axial extension portion 42 extends axially along and circumscribes annular filter element 26 and provides mounting support therefor. The transition flow duct has a first diameter section at 44 and a second diameter section at 46, with the second diameter section 46 having a smaller diameter than first diameter section 44. First diameter section 44 interfaces with annular filter element 26 and guides flow therethrough which is filtered by annular filter element 26. Annular filter element 28 in the embodiment of FIG. 1 has a hollow interior at 47. The noted second diameter section 40 interfaces with annular filter element 28 at hollow interior 47 and guides flow therethrough which is unfiltered by annular filter element 28. Transition flow duct 38 has an intermediate section as shown at 48 extending between first and second diameter sections 44 and 46 and guiding flow therebetween to transition from the noted first stage to the noted second stage. Intermediate section 48 is tapered along a frustoconical taper between the first and second diameter sections 44 and 46. In the embodiment of FIG. 1, fluid flows from upstream to downstream from first diameter section 44 to second diameter section 46. For performance data, reference is made to the incorporated '533 provisional application, page 14, including FIGS. 14, 15. In another embodiment, to be described in conjunction with FIG. 9, fluid flows from upstream to downstream from the second diameter section to the first diameter section. The fluid may be air or liquid. The annulus of the annular filter elements may have various shapes, including a circle, FIG. 5, an oval or racetrack, FIG. 6, and other shapes including an oblong, a kidney, a triangle, a pear, a rectangle, or other closed-loop shapes, and, as used herein, the term annular and annular includes the noted and other closed-loop shapes.

Fluid flow through second flow path segment 32 bypasses first annular filter element 26 and instead is filtered by second annular filter element 28 at third flow path segment 34 downstream of second flow path segment 32 and receiving unfiltered fluid flow serially therefrom. First annular filter element 26 may, if spirally wound tightly with no interior, include filter media across the entire lateral width thereof. Alternatively, annular filter element 26 may be spirally wound with a hollow interior which is then capped with an upstream cap, e.g. 49, FIGS. 3, 4, blocking fluid flow axially into such hollow interior. Second annular filter element 28 is spirally wound around a mandrel or the like, as is known, to include a hollow interior 47 through which fluid flows axially along the noted fourth flow path segment 36. Second annular filter element 28 extends laterally outwardly all the way to the wall of housing 22. First annular filter element 26 does not extend laterally outwardly all the way to the wall of housing 22, but rather is laterally spaced inwardly thereof by an annular concentric gap 50 through which fluid flows axially along the noted second flow path segment 32. An upstream spacer ring or cage 51 may be used to maintain such spacing at gap 50.

Figure 7:
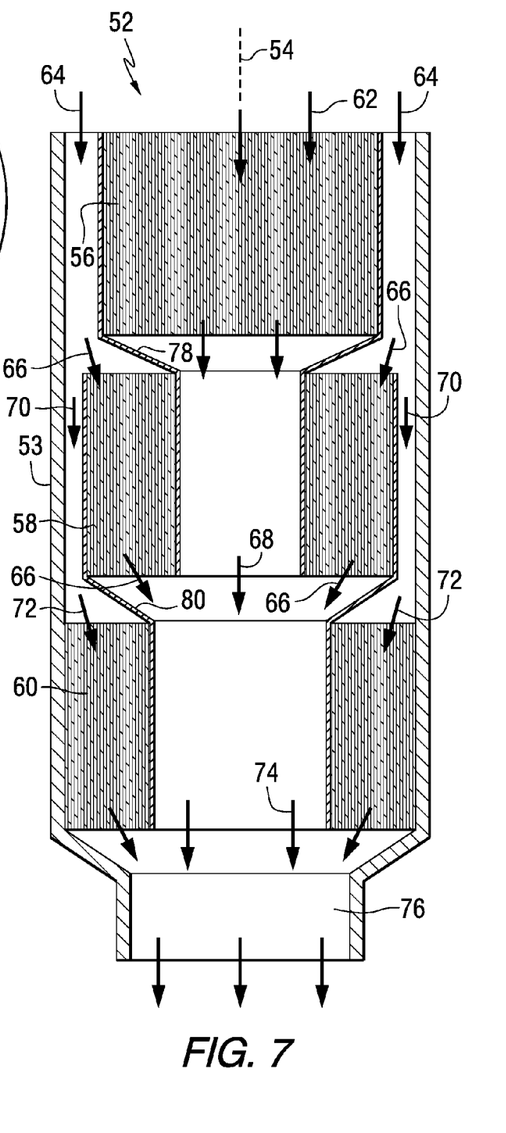
FIG. 7 is like FIG. 1 and shows another embodiment.

FIG. 7 shows a further embodiment for a filter 52 having a housing 53 extending axially along an axial direction 54 and directing fluid along an axial flow path from upstream to downstream, e.g. downwardly in FIG. 7. A plurality of annular filter elements such as 56, 58, 60 are provided in the housing. The axis of the annulus of each annular filter element extends axially along axial direction 54. The annular filter elements 56, 58, 60 are arranged in axially staggered relation in housing 53. The plurality of annular filter elements include at least a first annular filter element 56, and a second annular filter element 58 axially downstream of first annular filter element 56. Housing 53 has a plurality of flow path segments therethrough, including: a first flow path segment 62 flowing axially through first annular filter element 56 and filtered thereby; a second flow path segment 64 flowing axially along a path laterally adjacent first annular filter element 56 and unfiltered thereby, with the second flow path segment 64 being parallel to and laterally adjacent the first flow path segment 62; a third flow path segment 66 flowing axially through second annular filter element 58 and filtered thereby; a fourth flow path segment 68 flowing axially along a path laterally adjacent second annular filter element 58 and unfiltered thereby, with the fourth flow path segment 68 being parallel to and laterally adjacent the third flow path segment 66. Third and fourth flow path segments 66 and 68 are axially downstream of first and second flow path segments 62 and 64. First flow path segment 62 flows serially into fourth flow path segment 68. Second flow path segment 64 flows serially into third flow path segment 66. A fifth flow path segment 70 flows axially along a path laterally adjacent second annular filter element 58 and is unfiltered thereby. Fifth flow path segment 70 is parallel to and laterally adjacent third flow path segment 66. Third flow path segment 66 is laterally between fourth and fifth flow path segments 68 and 70. A third annular filter element 60 is axially downstream of second annular filter element 58. A sixth flow path segment 72 flows axially through third annular filter element 60 and is filtered thereby. A seventh flow path segment 74 flows axially along a path laterally adjacent third annular filter element 60 and is unfiltered thereby. Seventh flow path segment 74 is parallel to and laterally adjacent sixth flow path segment 72. Sixth and seventh flow path segments 72 and 74 are axially downstream of third, fourth and fifth flow path segments 66, 68 and 70. Fourth flow path segment 68 flows serially into seventh flow path segment 74. Third flow path segment 66 flows serially into seventh flow path segment 74. Fifth flow path segment 70 flows serially into sixth flow path segment 72. Sixth and seventh flow path segments 72 and 74 join at a common duct 76 downstream of third annular filter element 60 to discharge clean fluid therefrom. Inner duct 78 separates and isolates flow path segments 62 and 68 from flow path segments 64, 66 and 70. Inner duct 80 separates and isolates flow path segments 66, 68 and 74 from flow path segments 70 and 72.

Fluid flow through second flow path segment 64 bypasses first annular filter element 56 and instead some of such flow is filtered by second annular element 58 at third flow path segment 66 downstream of second flow path segment 64 and receiving unfiltered fluid flow serially therefrom. Fluid flow through fourth flow path segment 68 bypasses second annular filter element 58 and instead is filtered by first annular element 56 at first flow path segment 62 upstream of fourth flow path segment 68 and supplying filtered fluid serially thereto. Fluid flow through fifth flow path segment 70 bypasses second annular filter element 58 and instead is filtered by third annular filter element 60 at sixth flow path segment 72 downstream of fifth flow path segment 70 and receiving unfiltered fluid flow serially therefrom. Fluid flow through seventh flow path segment 74 bypasses third annular filter element 60 and instead is filtered by first annular filter element 56 at flow path segment 62 upstream of seventh and fourth flow path segments 74 and 68 and supplying filtered fluid flow serially thereto. Furthermore, fluid flow through seventh flow path segment 74 bypasses third annular filter element 60 and instead some of such flow is filtered by second annular filter element 58 at third flow path segment 66 upstream of seventh flow path segment 74 and supplying filtered fluid flow serially thereto. Second flow path segment 64 concentrically surrounds first flow path segment 62. Third flow path segment 66 concentrically surrounds fourth flow path segment 68. Fifth flow path segment 70 concentrically surrounds third flow path segment 66. Sixth flow path segment 72 concentrically surrounds seventh flow path segment 74.

The tri-flow path combination of FIG. 7 includes a first flow path provided by a filtered-bypass-bypass flow path 62-68-74 provided by a first portion 62 filtered by first filter element 56, a second portion 68 bypassing second filter element 58 and unfiltered thereby, and a third portion 74 bypassing third filter element 60 and unfiltered thereby. Fluid flows serially through first portion 62 then through second portion 68 then through third portion 74. The tri-flow path combination includes a second flow path provided by a bypass-filtered-bypass flow path 64-66-74 provided by a fourth portion bypassing first filter element 56 and unfiltered thereby, a fifth portion 66 filtered by second filter element 58, and a sixth portion 74 bypassing third filter element 60 and unfiltered thereby. Fluid flows serially through fourth portion 64 then through fifth portion 66 then through sixth portion 74. The tri-flow path combination includes a third flow path provided by a bypass-bypass-filtered flow path 64-70-72 provided by a seventh portion 64 bypassing first filter element 56 and unfiltered thereby, an eighth portion 70 bypassing second filter element 58 and unfiltered thereby, and a ninth portion 72 filtered by third filter element 60. Fluid flows serially through seventh portion 64 then through eighth portion 70 then through ninth portion 72. The noted third and sixth portions are common with each other, as shown at 74. The noted fourth and seventh portions are common with each other, as shown at 64.

Figure 8:
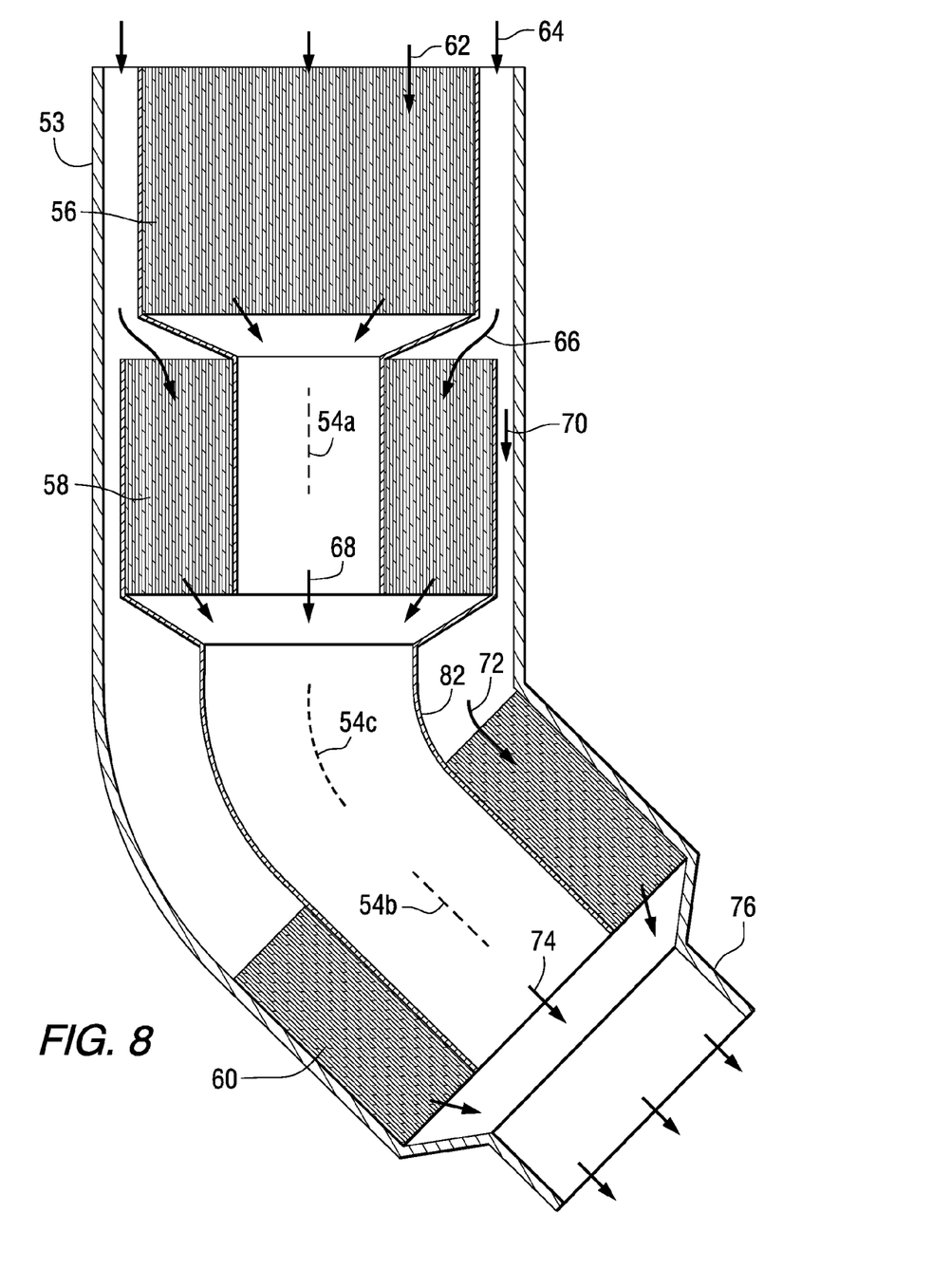
FIG. 8 is like FIG. 7 and shows another embodiment.

In FIG. 7, the noted axial direction through the housing is rectilinear. In an alternate embodiment, such axial direction may be curvilinear, e.g. including a curved connection duct or inner tube 82 as shown in FIG. 8 which uses like reference numerals from above where appropriate to facilitate understanding. Likewise in FIG. 1, an alternate embodiment may include a curvilinear axial direction through the housing. The axial direction 24, 54 may be curvilinear, e.g. axial direction 54 may include a curve 54c between first and second axial directions 54a and 54b meeting at a junction at an obtuse angle at curve 54c, with the axis of at least one of the plurality of annular filter elements being along the first axial direction 54a, and the axis of at least another of the plurality of filter elements being along the second axial direction 54b.

Figure 9:
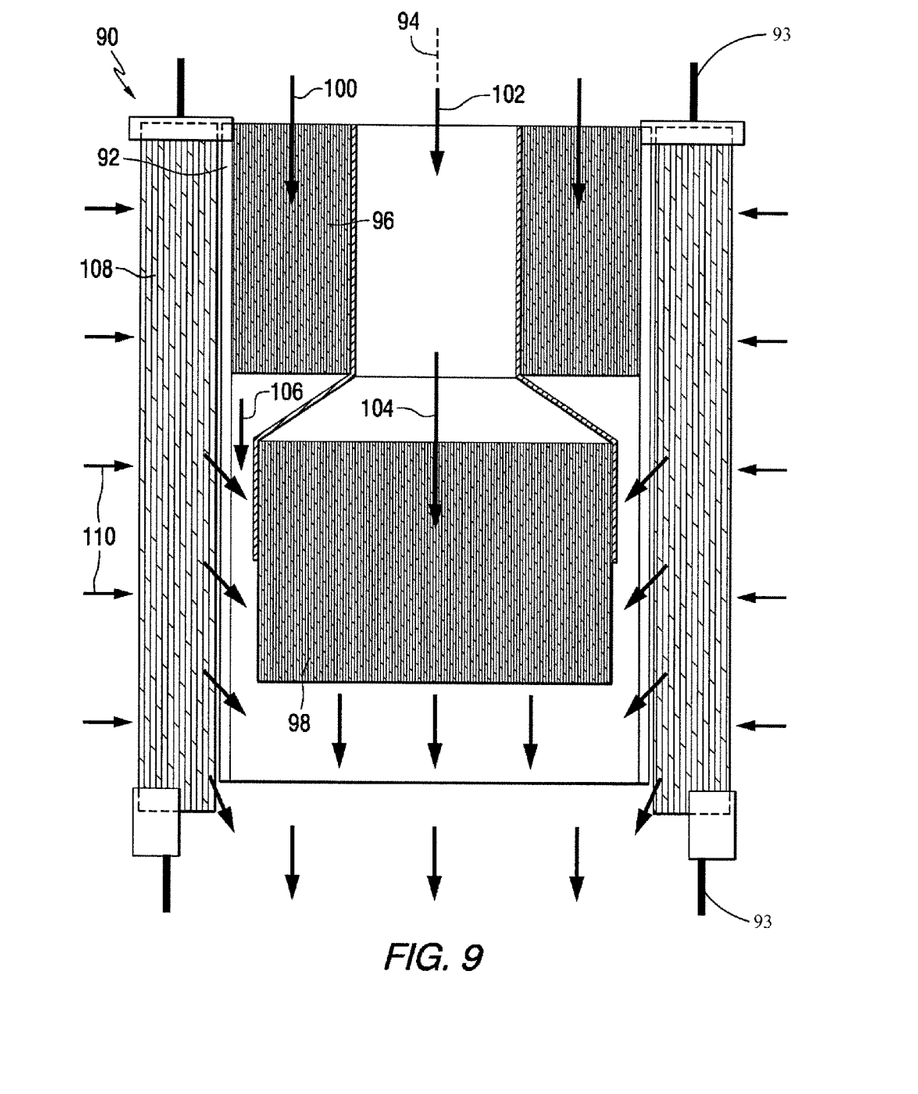
FIG. 9 is like FIG. 1 and shows another embodiment.

FIG. 9 shows a further embodiment including a filter 90 for a housing 92 extending axially along an axial direction 94 and directing fluid along an axial flow path therethrough from upstream to downstream, e.g. downwardly in FIG. 9. The filter includes a plurality of annular filter elements such as 96, 98 for positioning in the housing, with the axis of the annulus of each annular filter element extending axially along axial direction 94. The annular filter elements 96, 98 are arranged in axially staggered relation in the housing. The plurality of annular filter elements includes at least a first annular filter element 96, and a second annular filter element 98 axially downstream of first annular filter element 96. The fluid flow path has a plurality of flow path segments, including: a first flow path segment 100 flowing axially through first annular filter element 96 and filtered thereby; a second flow path segment 102 flowing axially along a path laterally adjacent first annular filter element 96 and unfiltered thereby, the second flow path segment 102 being laterally adjacent the first flow path segment 100; a third flow path segment 104 flowing axially through second annular filter element 98 and filtered thereby; and a fourth flow path segment 106 flowing axially along a path laterally adjacent the second annular filter element 98 and unfiltered thereby, with the fourth flow path segment 106 being laterally adjacent the third flow path segment 104. Third and fourth flow path segments 104 and 106 are axially downstream of first and second flow path segments 100 and 102. First flow path segment 100 flows serially into fourth flow path segment 106. Second flow path segment 102 flows serially into third flow path segment 104. In one embodiment, at least one of the following conditions is satisfied: a) the first flow path segment 100 concentrically surrounds the second flow path segment 102; and b) the fourth flow path segment 106 concentrically surrounds the third flow path segment 104. In the embodiment in FIG. 9, first flow path segment 100 concentrically surrounds second flow path segment 102, and fourth flow path segment 106 concentrically surrounds third flow path segment 104. In an alternate embodiment of FIG. 9, an additional outer annular filter element 108 may optionally be provided, concentrically surrounding the above described filter and, for example, receiving fluid directed radially or laterally thereinto as shown at arrows 110, for additional filtration capacity and performance, e.g. providing further filtration capacity in addition to first and second annular filter elements 96 and 98.

The system provides a method for filtering fluid including passing the fluid through a filter 90 in a housing 92 extending axially along an axial direction 94. The method includes directing fluid along an axial flow path from upstream to downstream, providing a plurality of annular filter elements such as 96, 98 for positioning in the housing, the axis of the annulus of each annular filter element extending axially along the noted axial direction 94, arranging the annular filter elements 96, 98 in axially staggered relation in the housing, providing a plurality of annular filter elements by providing at least a first annular filter element 96, and providing a second annular filter element 98 axially downstream of the first annular filter element. The method further includes providing a plurality of flow path segments including a first flow path segment 100 flowing axially through the first annular filter element 96 and filtered thereby, a second flow path segment 102 flowing axially along a path laterally adjacent the first annular filter element 96 and unfiltered thereby, the second flow path segment 102 being laterally adjacent the first flow path segment 100, a third flow path segment 104 flowing axially through the second annular filter element 98 and filtered thereby, and a fourth flow path segment 106 flowing axially along a path laterally adjacent the second annular filter element 98 and unfiltered thereby, the fourth flow path segment 106 being laterally adjacent the third flow path segment 104. The method includes providing the third and fourth flow path segments 104 and 106 axially downstream of the first and second flow path segments 100 and 102, and flowing the first flow path segment 100 serially into the fourth flow path segment 106, and flowing the second flow path segment 102 serially into the third flow path segment 104. The method further includes arranging the flow path segments to satisfy at least one of the following conditions: a) concentrically surrounding the second flow path segment 102 with the first flow path segment 100; and b) concentrically surrounding the third flow path segment 104 with the fourth flow path segment 106. In one embodiment, the method includes concentrically surrounding the second flow path segment 102 with the first flow path segment 100, and concentrically surrounding the third flow path segment 104 with the fourth flow path segment 106.

In one embodiment there is an apparatus comprising a housing 22 and a two-stage filter. The filter has a first stage 26 with a first inlet face and a second stage 28 with a second inlet face. The first and second inlet faces are defined by corresponding first and second axially staggered coiled media. The first stage of the filter includes a filter flow path defined by the first inlet face and through the first coiled media and out toward an exhaust duct that extends into the second stage and serves as a support around which is the second stage coiled media. The housing and the first coiled media define a bypass flow path that includes a clearance gap between an internal surface of the housing and an external perimeter of the first coiled media that is fluidly connected to the second inlet face. The housing and the two-stage filter are configured to optimize for initial pressure drop.

In one refinement the housing and two-stage filter are configured so that a ratio of the clearance gap divided by an inner diameter of the housing is in the range of 0.03 to 0.2.

In another refinement the housing and two-stage filter are configured so that the ratio is in the range of 0.07 to 0.09.

In another refinement the second stage includes a partially hollow core having a core diameter, and wherein the housing and two-stage filter are configured so that a ratio of the core diameter divided by an inner diameter of the housing is in the range of 0.25 to 0.8.

In another refinement the housing and two-stage filter are configured so that the ratio is in the range of 0.5 to 0.65.

In another refinement the filter flow path and the bypass flow path are concentric.

In another refinement each of the filter flow path and the bypass flow path are symmetrical.

In another refinement the apparatus further includes a perimeter seal preventing the passage of unfiltered fluid positioned substantially adjacent the second inlet end of the second stage and contacting both the housing and the second stage.

In another refinement the exhaust duct fluidly connects filtered flow from the first stage to filtered flow from the second stage, and the exhaust duct includes a bend.

In another refinement a cross-sectional area of the inlet face of at least one stage is greater than a cross-sectional area of an outlet of the at least one stage.

In another embodiment there is an apparatus comprising a housing and a two-stage filter. The two-stage filter has a first stage with a first inlet face and a second stage with a second inlet face. The first and second inlet faces are defined by corresponding first and second axially staggered coiled media. The first stage of the filter includes a filter flow path defined by the first inlet face and through the first coiled media and out toward an exhaust duct that extends into the second stage and serves as a support around which is the second stage coiled media. The housing and the first coiled media define a bypass flow path that includes a clearance gap between an internal surface of the housing and an external perimeter of the first coiled media that is fluidly connected to the second inlet face. The housing and the two-stage filter are configured to optimize for dust capacity.

In one refinement the housing and two-stage filter are configured so that a ratio of the clearance gap divided by an inner diameter of the housing is in the range of 0.01 to 0.1.

In another refinement the housing and two-stage filter are configured so that the ratio is in the range of 0.02 to 0.05.

In another refinement the second stage includes a partially hollow core having a core diameter. The housing and two-stage filter are configured so that the ratio of the core diameter divided by an inner diameter of the housing is in the range of 0.125 to 0.7.

In another refinement the housing and two-stage filter are configured so that a ratio is in the range of 0.25 to 0.4.

In another refinement the filter flow path and the bypass flow path are concentric.

In another refinement each of the filter flow path and the bypass flow path are symmetrical.

In another refinement the apparatus further includes a perimeter seal preventing the passage of unfiltered fluid positioned substantially adjacent the second inlet end of the second stage and contacting both the housing and the second stage.

In another refinement the exhaust duct fluidly connects filtered flow from the first stage to filtered flow from the second stage, and the exhaust duct includes a bend.

In another refinement a cross-sectional area of the inlet face of at least one stage is greater than a cross-sectional area of an outlet of the at least one stage.

In another embodiment there is an apparatus comprising a first straight through flow module and a second straight through flow module. The first straight through flow module has a first media including a first inlet end defining a first axial flow face. The first axial flow face receiving a first portion of an unfiltered fluid that passes through the first inlet face and the first media into a first exhaust chamber defined by and within the first filter media. The second straight through flow module has a second media having a second inlet end and defining a second axial flow face. The second axial flow face receiving a second portion of the unfiltered fluid that passes through the second inlet face and the second media. The first module and the second module are connected and the first inlet face is axially staggered from the second inlet face. An outlet of the first exhaust chamber is fluidly connected to the filtered second portion of the fluid exiting the second media by an exhaust duct that includes a bend.

In one refinement the exhaust duct bend includes an elbow joint.

In another refinement the exhaust duct bend has a flow redirecting angle of about 45 degrees.

In another refinement the apparatus further includes a housing wherein the second portion of unfiltered fluid flows between the housing and the first flow module, and wherein the housing and the first straight through flow module are configured to optimize for initial pressure drop.

In another refinement the housing and first module are configured so that a ratio of a clearance gap between an internal surface of the housing and an external surface of the first module divided by an inner diameter of the housing is in the range of 0.07 to 0.09.

In another refinement the second stage includes a partially hollow core having a core diameter, and wherein the housing and second module are configured so that the ratio of the core diameter divided by an inner diameter of the housing is in the range of 0.5 to 0.65.

In another refinement the filter flow through the flow module and the flow of the second portion of unfiltered fluid are concentric.

In another refinement the apparatus further comprises a housing wherein the second portion of unfiltered fluid flows between the housing and the first flow module, and wherein the housing and the first straight through flow module are configured to optimize for dust capacity.

In another refinement the housing and first module are configured so that a ratio of a clearance gap between an internal surface of the housing and an external surface of the first module divided by an inner diameter of the housing is in the range of 0.02 to 0.05.

In another refinement the second stage includes a partially hollow core having a core diameter, and wherein the housing and second module are configured so that the ratio of the core diameter divided by an inner diameter of the housing is in the range of 0.25 to 0.4.

In another embodiment there is a method of filtering a gas. The method includes filtering an unfiltered gas through a flow filter including at least two axially spaced apart inlet flow faces by passing a first portion of the unfiltered gas through a first inlet flow face of a first filter element portion and passing a second portion of the unfiltered gas into a second inlet flow face of a second filter element portion after circumventing the first inlet flow face. The first portion of unfiltered gas is filtered by passing through a first media defining the first inlet flow face and then passing into a filtered exhaust flow chamber that is fluidly connected via an exhaust duct to a volume wherein the filtered first portion of gas recombines with the filtered second portion of gas that has passed through a second media defining the second inlet flow face, and wherein the exhaust duct includes a bend to change the direction of flow.

In one refinement the bend is an elbow joint and the exhaust duct changes the direction of flow by about 90 degrees.

In another refinement the bend is an elbow joint and the exhaust duct changes the direction of flow by about 45 degrees.

In another embodiment there is an apparatus comprising an inner filter structure including an upstream filter module and a downstream filter module. The upstream filter module includes a first media having an upstream inlet face. The downstream filter module includes a second media having a downstream inlet face. The downstream filter module has a downstream outlet fluidly connected to an upstream outlet of the upstream filter module. The apparatus also includes an outer pleated filter element that surrounds the inner filter structure and is sealingly connected to only one of the filter modules substantially adjacent to the inlet face of the one of the filter modules. The inner filter structure and the outer pleated filter element are configured such that a filter flow path and a bypass flow path are available to an unfiltered fluid flowing downstream from upstream of the upstream filter module. The filter flow path is through the upstream inlet face into the first media and is not directly fluidly connected to the downstream inlet face and the bypass flow path. The filter flow path is directly fluidly connected to the downstream inlet face.

Figure 10:
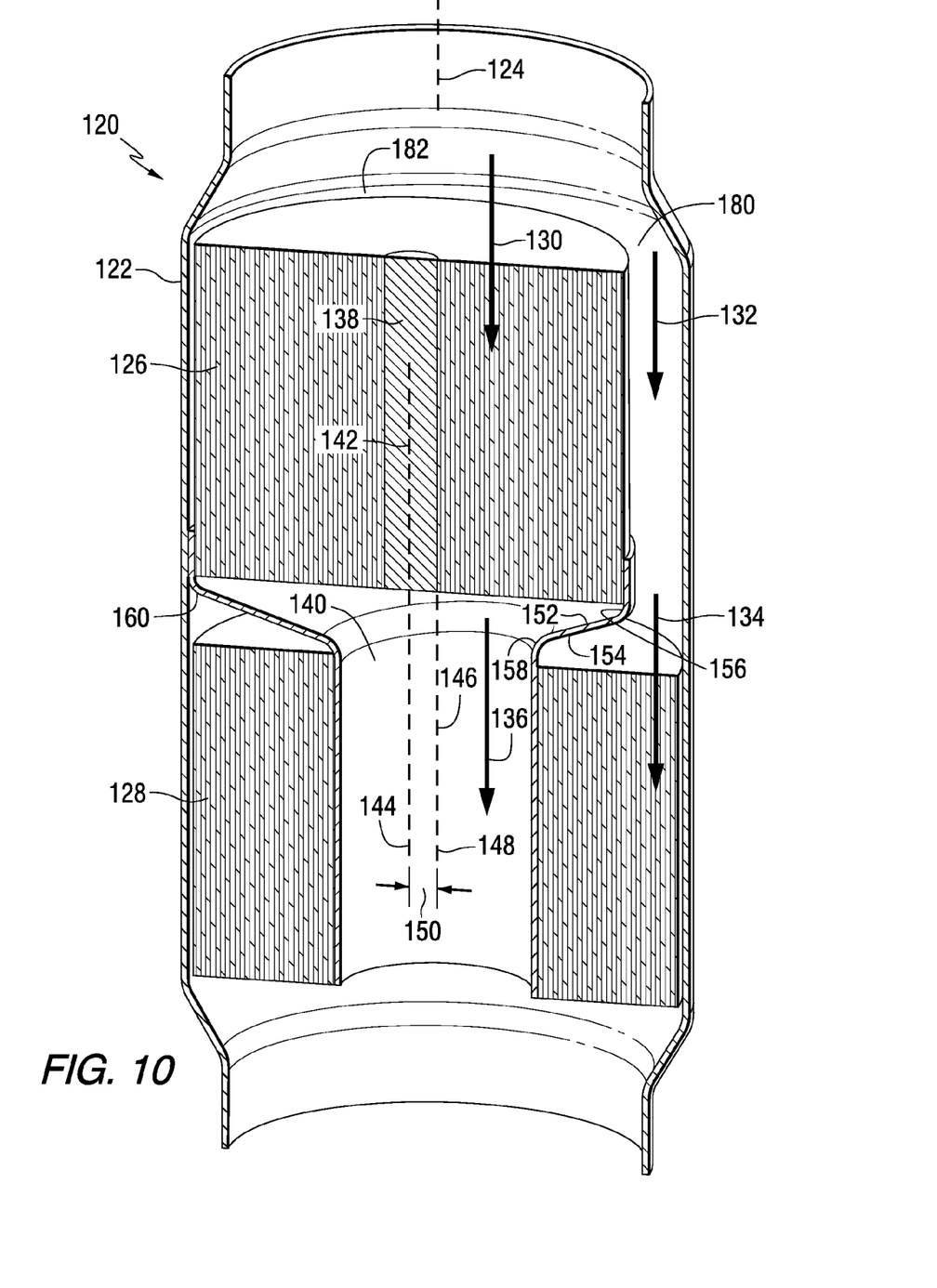
FIG. 10 is like FIG. 1 and shows another embodiment.

FIG. 10 shows a further embodiment including a filter 120 for a housing 122 and filtering fluid flowing along an axial flow path in an axial direction 124 from upstream to downstream, e.g. downwardly in FIG. 10. The filter includes first and second axially staggered filter elements 126 and 128. Filter element 126 is an annular filter element which has a closed center, e.g. with filter media extending all the way thereacross, or closed by a central plug such as 138. Filter element 128 is an annular filter element with an open center, e.g. at hollow interior 140. The flow path has a plurality of flow path segments, including: a first flow path segment 130 flowing axially through first filter element 126 and filtered thereby; a second flow path segment 132 flowing axially along a path laterally adjacent first filter element 126 and unfiltered thereby, with the second flow path segment 132 being laterally adjacent the first flow path segment 130; a third flow path segment 134 flowing axially through the second filter element 128 and filtered thereby; and a fourth flow path segment 136 flowing axially along a path laterally adjacent the second filter element 128 and unfiltered thereby, with the fourth flow path segment 136 being laterally adjacent the third flow path segment 134. Third and fourth flow path segments 134 and 136 are axially downstream of first and second flow path segments 130 and 132. First flow path segment 130 flows serially into fourth flow path segment 136. Second flow path segment 132 flows serially into third flow path segment 134. One of the second and fourth flow path segments 132 and 136, e.g. second flow path segment 132, has an eccentric shape in lateral cross-section, e.g. see FIG. 10, relative to a respective one of the first and third flow path segments 130 and 134, e.g. first flow path segment 130. In one embodiment, the noted eccentric shape is a crescent. In the embodiment of FIG. 10, the second flow path segment 132 has the eccentric shape relative to the first flow path segment 130. Third flow path segment 134 concentrically surrounds fourth flow path segment 136. Second flow path segment 132 partially surrounds first flow path segment 130. In an alternate embodiment, with fluid flowing in the reverse direction to that shown in FIG. 10, e.g. flowing upwardly in FIG. 10, the now fourth flow path segment 132 has the eccentric shape relative to the now third flow path segment 130, and the now first flow path segment 134 concentrically surrounds the now second flow path segment 136, and the now fourth flow path segment 132 partially surrounds the now third flow path segment 130.

In FIG. 10, one of the filter elements, e.g. filter element 126, is eccentrically offset relative to the other of the filter elements, e.g. filter element 128. In one embodiment, first filter element 126 is a first annular filter element having a first centerline 142 extending axially along a first axis 144 along the noted axial direction. Second filter element 128 is a second annular filter element having a second centerline 146 extending axially along a second axis 148 along the noted axial direction. First and second axes 144 and 148 are laterally spaced from each other as shown at 150 such that first and second centerlines 142 and 146 are laterally offset from each other and axially nonaligned. A transfer duct 152 extends between the first and second filter elements 126 and 128 and separates and isolates the first and fourth flow path segments 130 and 136 from the second and third flow path segments 132 and 134. The transfer duct has a transition section 154 between first and second filter elements 126 and 128. Transition section 154 is an eccentric frustocone. Transfer duct 152 has a first flow port 156 at the first filter element 126, and a second flow port 158 at the second filter element 128. One of the flow ports, e.g. flow port 158, has a centerline 146 extending axially along a given axis 148, and the other of the flow ports, e.g. flow port 156, is eccentrically disposed about the noted give axis 148. The noted other flow port, e.g. flow port 156, has a circumference 160 defined along a varying radius from the noted given axis 148. The noted other flow port 156 has a first diameter, and the noted one flow port 158 has a second diameter, with the noted second diameter being smaller than the noted first diameter.

Figure 11:
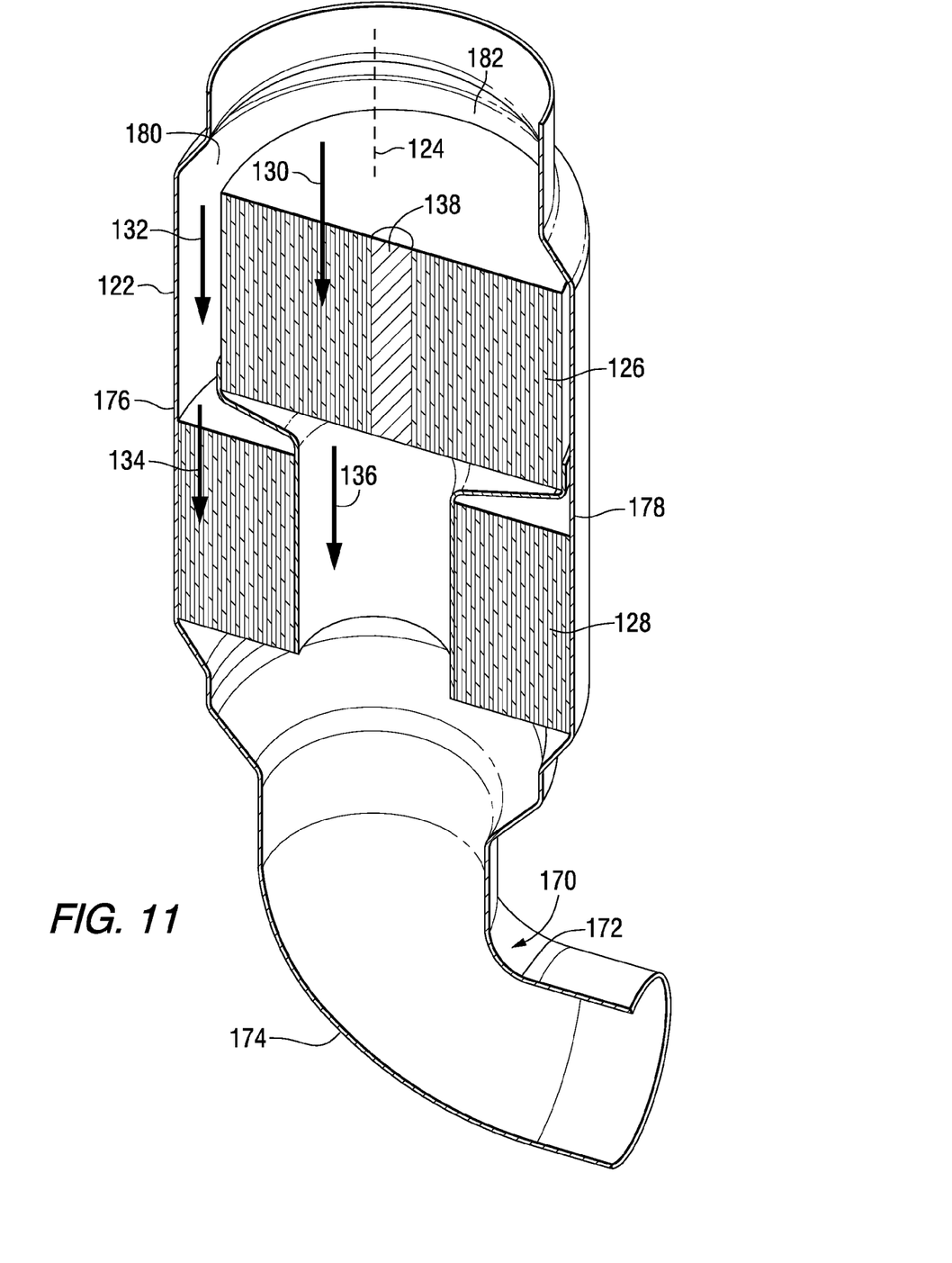
FIG. 11 is like FIG. 10 and shows a further embodiment.

FIG. 11 shows a further embodiment and uses like reference numerals from FIG. 10 where appropriate to facilitate understanding. First and second filter elements 126 and 128 are positioned in a housing 122 having an elbow 170 downstream of second filter element 128. The elbow has an inner curve 172 and an outer curve 174. The outer curve has a larger radius of curvature than the inner curve. Housing 122 has laterally distally opposite first and second lateral sides 176 and 178. Outer curve 174 of the elbow is at first lateral side 176 of the housing. The noted eccentric shape of second flow path segment 132 provides a lateral cross-sectional flow area with a first portion 180 larger than a second portion 182. First portion 180 is at first lateral side 176 of the housing. First portion 180 and outer curve 174 are axially aligned along first lateral side 176. In one embodiment, the eccentric shape is a crescent having a largest cross-sectional flow area at the noted first portion 180. The offset, eccentric configuration of FIGS. 10, 11 biases the outlet velocity profile of the filter towards the large gap side 176 at portion 180, in turn reducing pressure drop and providing a reduced dP advantage in the configuration of FIG. 11 having a turning elbow on the downstream end, with the noted large gap at 180 and outer curve 174 of the elbow axially aligned along the noted first lateral side 176 of the housing. FIG. 11 shows a configuration biasing velocity to the outer side of the discharge elbow, i.e. providing both the larger gap at first portion 180 and the outer curve 174 of the elbow along the same lateral side 176 of the housing. This biasing of flow velocity to the outer side of the elbow is predicted by CFD (Computational Fluid Dynamics) modeling software to show a 26% improvement in reduced pressure drop (for elbow pressure drop contribution taken by itself; not overall pressure drop) as compared to no bias with uniform entrance velocity provided by a concentric arrangement, e.g. FIG. 1, having a downstream exit elbow. The system provides a method for reducing pressure drop in a configuration having a downstream elbow.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A filter comprising:
    a housing extending axially along an axial direction and directing fluid along an axial flow path therethrough from upstream to downstream,
    a plurality of annular filter elements in said housing, the axis of the annulus of each annular filter element extending axially along said axial direction, said annular filter elements being arranged in axially staggered relation in said housing, said plurality of annular filter elements comprising at least a first annular filter element, and a second annular filter element axially downstream of said first annular filter element,
    said housing having a plurality of flow path segments comprising a first flow path segment flowing axially through said first annular filter element and filtered thereby, a second flow path segment flowing axially along a path laterally adjacent first annular filter element and unfiltered thereby, said second flow path segment being laterally adjacent said first flow path segment, a third flow path segment flowing axially through said second annular filter element and filtered thereby, a fourth flow path segment flowing axially along a path laterally adjacent said second annular filter element and unfiltered thereby, said fourth flow path segment being laterally adjacent said third flow path segment, said third and fourth flow path segments being axially downstream of said first and second flow path segments, said first flow path segment flowing serially into said fourth flow path segment, said second flow path segment flowing serially into said third flow path segment, and
    an outer annular filter element concentrically surrounding said first and second annular filter elements and providing additional filtration capacity in addition to said first and second annular filter elements.

2. The filter according to claim 1 wherein said outer annular filter element receives fluid flow laterally thereinto.

3. A filter for a housing extending axially along an axial direction and directing fluid along an axial flow path therethrough from upstream to downstream, the filter comprising:
    a plurality of annular filter elements for positioning in said housing, the axis of the annulus of each annular filter element extending axially along said axial direction, said annular filter elements being arranged in axially staggered relation in said housing, said plurality of annular filter elements comprising at least a first annular filter element, and a second annular filter element axially downstream of said first annular filter element, and
    an outer filter element surrounding the plurality of annular filter elements,
    said housing having a plurality of flow path segments comprising a first flow path segment flowing axially through said first annular filter element and filtered thereby, a second flow path segment flowing axially along a path laterally adjacent first annular filter element and unfiltered thereby, said second flow path segment being laterally adjacent said first flow path segment, a third flow path segment flowing axially through said second annular filter element and filtered thereby, a fourth flow path segment flowing axially along a path laterally adjacent said second annular filter element and unfiltered thereby, said fourth flow path segment being laterally adjacent said third flow path segment, said third and fourth flow path segments being axially downstream of said first and second flow path segments, said first flow path segment flowing serially into said fourth flow path segment, said second flow path segment flowing serially into said third flow path segment,
    wherein at least one of the following conditions is satisfied:
        a) said first flow path segment concentrically surrounds said second flow path segment;
        b) said fourth flow path segment concentrically surrounds said third flow path segment.

4. The filter according to claim 3 wherein said first flow path segment concentrically surrounds said second flow path segment.

5. The filter according to claim 3 wherein said fourth flow path segment concentrically surrounds said third flow path segment.

6. The filter according to claim 3 wherein in combination said first flow path segment concentrically surrounds said second flow path segment, and said fourth flow path segment concentrically surrounds said third flow path segment.

7. A method for filtering fluid including passing the fluid through a filter in a housing extending axially along an axial direction, the method comprising:
    directing fluid along an axial flow path from upstream to downstream,
    providing a plurality of annular filter elements for positioning in said housing, the axis of the annulus of each annular filter element extending axially along the axial direction, arranging said annular filter elements in axially staggered relation in said housing, the plurality of annular filter elements including a first annular filter element a second annular filter element axially downstream of said first annular filter element,
providing an outer filter element surrounding the plurality of annular filter elements,
providing a plurality of flow path segments including a first flow path segment flowing axially through said first annular filter element and filtered thereby, a second flow path segment flowing axially along a path laterally adjacent said first annular filter element and unfiltered thereby, said second flow path segment being laterally adjacent said first flow path segment, a third flow path segment flowing axially through said second annular filter element and filtered thereby, and a fourth flow path segment flowing axially along a path laterally adjacent said second annular filter element and unfiltered thereby, said fourth flow path segment being laterally adjacent said third flow path segment, providing said third and fourth flow path segments axially downstream of said first and second flow path segments,
flowing said first flow path segment serially into said fourth flow path segment,
flowing said second flow path segment serially into said third flow path segment,
arranging said flow path segments to satisfy at least one of the following conditions:
  a) concentrically surrounding said second flow path segment with said first flow path segment; and
  b) concentrically surrounding said third flow path segment with said fourth flow path segment.

8. The method according to claim 7 comprising concentrically surrounding said second flow path segment with said first flow path segment.

9. The method according to claim 7 comprising concentrically surrounding said third flow path segment with said fourth flow path segment.

10. The method according to claim 7 comprising in combination concentrically surrounding said second flow path segment with said first flow path segment, and concentrically surrounding said third flow path segment with said fourth flow path segment.

* * * * *